(12) United States Patent
Gustavsson et al.

(10) Patent No.: US 9,322,950 B2
(45) Date of Patent: Apr. 26, 2016

(54) METHOD AND APPARATUS FOR FINDING STICK-UP HEIGHT OF A PIPE OR FINDING A JOINT BETWEEN TWO PIPES IN A DRILLING ENVIRONMENT

(71) Applicant: VOCA AS, Kristiansand (NO)

(72) Inventors: David Gustavsson, Kristiansand (NO); Torbjørn Engedal, Flekkerøy (NO)

(73) Assignee: VOCA AS, Kristiansand (NO)

( * ) Notice: Subject to any disclaimer, the term of this patent is extended or adjusted under 35 U.S.C. 154(b) by 71 days.

(21) Appl. No.: 14/346,463

(22) PCT Filed: Sep. 27, 2012

(86) PCT No.: PCT/NO2012/050186
§ 371 (c)(1),
(2) Date: Mar. 21, 2014

(87) PCT Pub. No.: WO2013/048260
PCT Pub. Date: Apr. 4, 2013

(65) Prior Publication Data
US 2014/0233804 A1 Aug. 21, 2014

(30) Foreign Application Priority Data

Sep. 29, 2011 (NO) .................................. 20111325

(51) Int. Cl.
| | |
|---|---|
| G06K 9/00 | (2006.01) |
| G01V 8/10 | (2006.01) |
| E21B 41/00 | (2006.01) |
| E21B 44/00 | (2006.01) |
| E21B 19/16 | (2006.01) |
| E21B 47/00 | (2012.01) |
| G06T 7/00 | (2006.01) |

(52) U.S. Cl.
CPC ................ *G01V 8/10* (2013.01); *E21B 19/165* (2013.01); *E21B 41/00* (2013.01); *E21B 44/00* (2013.01); *E21B 47/00* (2013.01); *E21B 47/0002* (2013.01); *G06T 7/0004* (2013.01)

(58) Field of Classification Search
None
See application file for complete search history.

(56) References Cited

U.S. PATENT DOCUMENTS

| 5,107,705 A * | 4/1992 | Wraight .................. E21B 19/20 348/85 |
| 2009/0159294 A1 * | 6/2009 | Abdollahi ............... E21B 19/14 166/377 |
| 2009/0164125 A1 | 6/2009 | Bordakov |
| 2010/0135750 A1 | 6/2010 | Tarique |

FOREIGN PATENT DOCUMENTS

| EP | 0449710 A2 | 10/1991 |
| WO | 2006/041306 A1 | 4/2006 |
| WO | 2007/061315 A1 | 5/2007 |
| WO | 2012/032384 A1 | 3/2012 |

* cited by examiner

*Primary Examiner* — Shefali Goradia
(74) *Attorney, Agent, or Firm* — Knobbe Martens Olson & Bear LLP

(57) ABSTRACT

The present invention generally relates to a method, apparatus, a computer program and computer for automated detection of pipe (2) in a drilling operation, where the method comprising: using one or a plurality of sensors (41) to obtain one ore a plurality of data sets and/or images representing the pipe area, the data sets and/or images representing 3D and/or 2D images of the drilling operation; and processing the data sets and/or images to identify the pipe in the data sets and/or images.

12 Claims, 19 Drawing Sheets

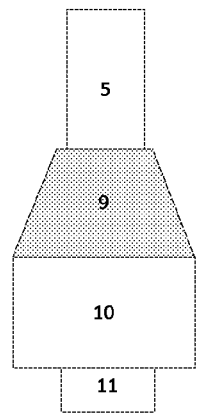
Fig. 11A
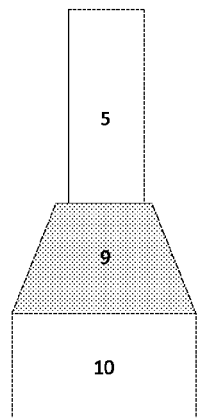
Fig. 11B
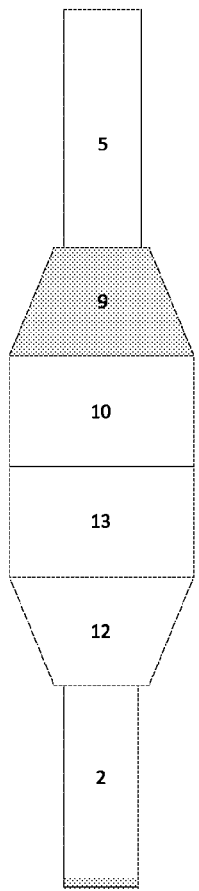
Fig. 11C
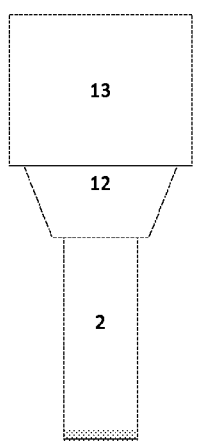

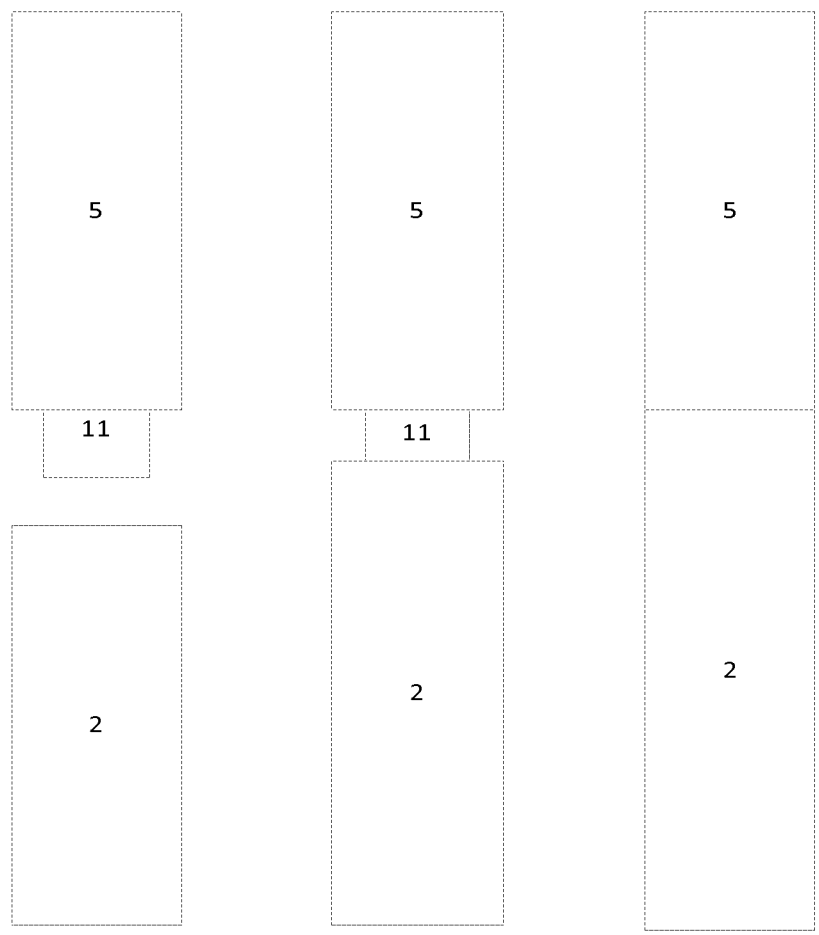

METHOD AND APPARATUS FOR FINDING STICK-UP HEIGHT OF A PIPE OR FINDING A JOINT BETWEEN TWO PIPES IN A DRILLING ENVIRONMENT

CROSS-REFERENCE TO RELATED APPLICATIONS

This application is the U.S. National Phase under 35. U.S.C. §371 of International Application PCT/NO2012/050186, filed Sep. 27, 2012, which claims priority to Norwegian Patent Application No. 20111325, filed Sep. 29, 2011. The disclosures of the above-described applications are hereby incorporated by reference in their entirety.

TECHNICAL FIELD

The present invention generally relates to a device and a system for finding stick-up height of a pipe or finding a joint between two pipes in a drilling environment. The invention is used both during mounting and dismounting (drilling and tripping) of pipes strings, stands and/or casings. More specifically, the present invention relates to a method and a device for finding the stick-up height of a pipe above the drill-floor when located in the mouse hole, rat hole, or well center when assembling pipes (stand-building) before the stand is used for drilling. Optionally the stick-up height can be the portion of the pipe-string sticking up from the drill-floor through the rotary table or well center, or above the set-back construction (fingerboard), when assembling or disassembling stands or pipes to the drill-string for continued (drilling) operation. Or, if no stick-up height is found, return information that there is no pipe present. Further, the method and device relates to finding the joint between two pipes for tightening or un-tightening the pipes from each other. The process of tightening or un-tightening is normally carried out by a so called iron rough neck, and the rough neck needs information about the position of the joint between the two pipes. The invention will provide this information and input this information to the means that control the rough neck. Additional information provided by the invention may be pipe diameter and distance between the pipes for automatic control and optimization of pipe positions and forces applied by the rough neck.

The invention also comprise an optional system for collecting, storing and manage the information related to the pipe handling, and further presenting the information via computer or control mechanisms to the operator that will act on this information to run the drilling operation. Such activities may be to initiate the operation of the rough neck when needed.

BACKGROUND OF THE INVENTION

Drilling equipment for the energy industry is being developed and optimized for increased automation and autonomy. Pipe handling systems are especially challenging because of the rough handling of pipes. Because of rough conditions and handling it is difficult or close to impossible to instrument the pipes, which again makes it a challenging task to automate pipe handling. Several equipment developers and manufacturers have automated large parts of pipe handling for drilling equipment, but there are still operations that need manual intervention. Several equipment manufacturers and companies have tried to solve the above mentioned problems without success. The present invention is related to automation of such manual interventions that will work in challenging environments such as bright sunlight, complete darkness, artificial lightning and large physical vibrations.

U.S. Pat. No. 7,114,235 define a method and apparatus for making and breaking tubular connections. The pipe joining system includes a movable support frame for supporting and integrating on a rig floor the tools associated with making and braking the connection between two tubulars.

Common to most available advanced systems is that they present solutions related the mechanics related to making and braking the tubular joints, and not to automated location of either the tubular joint or the single stick-up height of a tubular part sticking up from a mouse-hole, rotary table or well center on a drill floor. Until now the identification of a tubular in a mouse-hole or a rotary table has been relying on human detection and activation of the tools associated with making and breaking the connections between two tubulars.

The challenges with current state of the art methods and technologies are the required level of involvement of human operators. In rough conditions this becomes more apparent, and may also represent a security risk. Also if the operation of identifying and recognizing the tubulars in a drilling operation fails it may cause considerable delays and lead to lost production-time.

There is a need for an improved system to provide automatic identification of tubular joints and of stickup-height of tubular in a mouse-hole, rotary table or well center, or even identification whether there are a tubular in the mouse-hole, rotary table or well center or not. The present invention fills these needs.

SUMMARY OF THE PRESENT INVENTION

It is an object of the invention to provide a method and system for determining the stick-up height of a pipe, stand, string or casing above the drill-floor when located in the mouse hole, rat hole, well center, rotary table or above the setback construction when assembling pipes or stands. The method and system may comprise a computer means or the like that can handle, store and make calculations and predictions related to the pipe handling. The system may also comprise a display unit that may interact with the operator. The operator may override and/or control and/or give input to the operation of the pipe handling operation. To achieve the stick-up height determination, a 3D sensor is mounted in such a position and orientation that a sufficient large part of the sensors field of view are covering the drill floor, or a recognized shape covering the pipe below the stick-up height, or a known portion around an imaginary plane defined by a pre-defined value or by recognition of a known object, a sufficient large part of the sensors field of view are covering the pipe when present, and, if a pipe is present in the mouse hole, rat hole, well center, rotary table or above the setback construction, the portion of the pipe sticking up is completely covered inside the field of view. If a pipe is present, the height of the portion of the pipe sticking up is determined.

When rough neck is used in this document, it shall be understood that it covers any kind of tool used in the operation of mounting and dismounting pipes, strings, casings, stands and similar.

For convenience the following description when the word pipe is used it shall be understood that this may represent a stand, string or casing.

For convenience the following description when the word mouse hole is used it shall be understood that this may represent a mouse hole, rat hole, well center, rotary table or any other place a pipe section may be operated on, stored or manufactured. This shall also include the setback construction.

For convenience the following description when the word drill-floor is used it shall be understood that this may represent a flat drill floor around the mouse hole, an imaginary plane around the pipe or mouse hole, an imaginary plane calculated by using and/or identifying and/or recognising the shape of a non-planar surrounding surface of the pipe.

Another object of the invention is to determine if a lower pipe is present, and if present, the position and orientation of the lower pipe; and determine if an upper pipe is present, and, if present, determine the position and orientation of the upper pipe. Furthermore, if an upper and a lower pipe are present determine the vertical distance between the two pipes. In this embodiment the sensor may be mounted in an equal manner as for the determination of the stick up height of a pipe above the drill-floor when located in a mouse hole, or such that only parts of the pipes are in the field of view.

Another object of the invention is to determine, if present, the location of the connection point of two connected pipes. In this embodiment the sensor is mounted in an equal manner as for the determination of the stick up height of a pipe above the drill-floor when located in a mouse hole or such that only parts of the pipes are in the field of view.

It is to be understood that the embodiments described here and the assumptions made is for clearness and understanding, and that various equivalents, alternatives and modifications are possible within the scope of the invention.

Standards and specifications in the drilling industry are common, and present invention is not limited in any way or prohibited to be manufactured to comply with any given valid standard or specification governing the environment of which the invention is meant to be operated in.

BRIEF DESCRIPTION OF THE DRAWINGS

FIG. 11A-F are side view system overviews of the Tool Joints during pipe connections where
  11 A) shows disconnected joints
  11 B) shows connected but not tightened pipes
  11 C) shows connected and tightened pipes
  11 D) shows disconnected joints
  11 E) shows connected but not tightened pipes
  11 F) shows connected and tightened pipes

FIG. 16 B shows the view from the mounted sensor (3D sensor and/or camera).

Figure 1A:
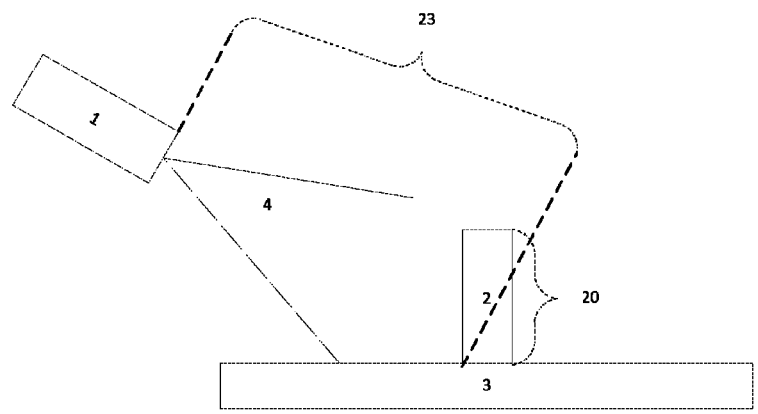
FIG. 1A is a side view system overview of a typical setup for determination of Stick Up Height where the 3D sensor is mounted to capture both part of the drill-floor as well as the stick-up height of a pipe above the drill-floor.

All the different parts shown in the figures are shown as box schematics, and it shall be understood that the different parts may be configured in a variety of alternative ways such that they may include elements such as separate controller devices and computer means.

Specific terminology will be resorted to for the sake of clarity in the invention description and claims. It is to be understood that each specific term includes all technical equivalents which operate in a similar manner to accomplish a similar purpose.

3D sensor—Sensor technology combined with algorithms for retrieving 3D information about a scene. Common technologies comprise stereo camera (i.e. two cameras) combined with triangulation algorithms, active stereo with structured light (fringe pattern) combined with triangulation, laser (LIDAR) scanner, radar or Time-of-Flight sensors.

Set Back:

To place stands of drill pipe and drill collars in a vertical position to one side of the rotary table in the derrick or mast of a drilling or workover rig.

Catwalk:

The ramp at the side of the drilling rig where pipe is laid to be lifted to the derrick floor by the catline or by an air hoist.

Contrast Enhancement Filter—Contrast enhancement filter expands the distribution of intensities in an image, such that important details are enhanced while other less important details maybe suppressed.

Covariance matrix—A covariance matrix is a matrix whose element in the i,j position is the covariance between the $i^{th}$ and $j^{th}$ elements of a random vector. The covariance matrix is estimated by $$C = \sum_{i=1}^{N} (p_i - \bar{p})^T (p_i - \bar{p})$$

where $$\bar{p} = \frac{1}{N} \sum_{i=1}^{N} p_i$$

(i.e. the mean value). For 3D data—p=(x,y,z)—the covariance matrix is a 3×3 matrix containing information about how the data set varies along the axis.

A weighted covariance matrix can be constructed by adding a weight factor to each point $$C_w = \sum_{i=1}^{N} w_i (p_i - \bar{p})^T (p_i - \bar{p})$$

By doing an eigenvalue decomposition of the covariance matrix orthogonal orientations called principal components are obtained. The first principal component has the highest possible variance, and the j:te principal component has as high as possible variance constraint by that it is orthogonal toward all previous principal components. The method is called Principal Component analysis (PCA). The corresponding eigenvalue gives how much of the variance is explained by the different principal components. For 3D data, the first two principal components define a plane that is optimal in the sense that most of the variance is explained by the plane. The 3.d principal component is a normal to the plane and is often used as an orientation of the data set (as in the normal estimation algorithm).

Exposure—Exposure is the amount of light that falls on to the camera sensor. The exposure depends mainly on the (lens) aperture and the shutter speed. By adapting the exposure good images can be captured at varying illumination conditions such as day/night or sunny/cloudy days.

HDR imaging—High Dynamic Range imaging is a technique where multiple images captured with different exposure is combined to enhance the range of each pixel and hence include high contrast in both "bright" and "dark" areas of an image (high and low values/intensities). The technique is often used Kalman filter—The Kalman filter is a mathematical method named after Rudolf E. Kalman. Its purpose is to use measurements that are observed over time that contain noise (random variations) and other inaccuracies, and produce values that tend to be closer to the true values of the measurements and their associated calculated values.

Level Set Segmentation—see segmentation.

Mean Squared Error (MSE)—Measure the squared error between an observation (y) and estimation (y')–(y–y')^2. Summation over all pairs of observations and estimations gives the sum of squared error, and divided by the number of observation gives the mean square error. MSE is simply the average squared error computed over a set. The MSE can be used both as an optimal criteria for finding an estimator (i.e. to minimize the MSE) and as method for evaluating an estimator. Replacing the mean (in the definition above) with the median give the median squared error (with is robust to is outliers). Replacing the squared error with the absolute difference (i.e. abs(y–y')) gives the Mean Absolute difference (MAD).

Inliers/outliers—an outlier is an observation that is numerically distant from the rest of the data. Outliers are often indicative of measurement error. An inlier is an observation which is not an outlier. A model outlier is an observation that cannot be explained by the model (or does not fit the model) and a model inlier is an observation that can be explained by the model. For a 3D data set, a subset of point may be explained by a plane (possible estimated from the data), while other points may not be explained by the plane because they may lie on a different plane or on a pipe.

Otzus Method—method for automatically determine optimal thresholds value T in histogram. It is based on the assumption that the histogram contains two classes of data that should be separated (i.e. the histogram contains two modes). The optimal histogram threshold T is determine by minimizing the intra class variance.

Principial Component Analysis (PCA) See covariance matrix.

RANSAC (RANdom SAmple Consensus)—A robust estimator commonly used in computer vision. Instead of using all points in the data set to estimate a model (for example a plane), the minimum number of points is used to exactly fit the model (in the plane case, 3 points are required). The number of inliers to the model is counted and used as a fitting criterion (sometimes the model is re-estimated using solely the inliers). This is repeated many times until a sufficient good model has been found (or maximum number of iterations has been reached). The general method is often called SAC-model or SAC-estimator (SAmple Consensus) and many slightly different versions exist.

Robust Estimator—Robust statistical methods are methods that are insensitive of outliers in the data set. Outliers in the data set has no or limited impact on a robust estimator.

Segmentation—Segmentation is the task of dividing an image into different parts representing different objects. In the present innovation the pipe objects are segmented (and the other objects are the background). Most segmentation methods are based on the assumption that the objects to be segmented have different colors (i.e. contrast difference between the objects). Edge based segmentation methods find the location of the contrast difference which represent the object boundary. One common edge based segmentation method is level set which evolve a curve representing the object boundary. The curve starts inside the object using a starting seed (i.e. a region or point inside the object) and evolve outward until the object boundary is detected.

Mouse hole—is used to temporarily place pipes in connection with drilling operations and is also used to build up pipe stands.

Rat hole—is used to temporarily place stands in connection with drilling operations.

Rotary table—is used on drilling rigs to rotate the actual pipe. Modern drill rigs often use top drive instead of rotary table.

Top drive—used to rotate the actual pipe, normally located in the derrick (the mast) above the drill floor.

Pipe handler—used to move and handle pipes and stands.

Well Center—the well center is the location where the drill pipes enters the well into a borehole. For drill rigs using a rotary table, the rotary table is located in the well center of the drill floor.

Stand Rack—is used to temporarily store complete stands when mounted in connection with drilling operations.

DETAILED DESCRIPTION OF EMBODIMENTS OF THE INVENTION

The system and device of the present invention are described in several operation modes where the system has three main operational modes 1, 2 and 3:

1. to determine the stick-up height of a portion of a pipe above the drill-floor when located in the mouse hole when assembling pipes
2. to determine if a lower pipe is present, and if present, the position and orientation of the lower pipe; and determine if an upper pipe is present, and, if present, determine the position and orientation of the upper pipe. Furthermore, if an upper and a lower pipe are present determine the vertical distance between the two pipes.

3. to determine, if present, the location of the connection point of two connected pipes Operation mode 1 may have the 3D sensor mounted in different ways as described by the embodiments.

Operation mode 2 and 3 may have the 3D sensor mounted in different ways as described by the embodiments.

All operation modes may also comprise an optical camera as described by the embodiments.

Figure 1B:
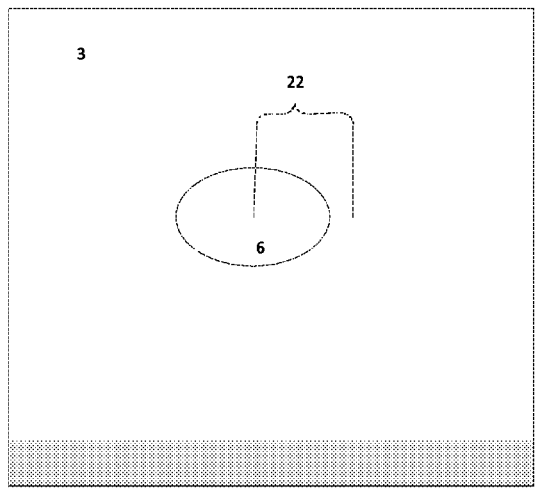
FIG. 1B shows the view from the 3D sensor in FIG. 1A when no pipe is present in the mouse hole, rat hole or the rotary table.
Figure 1C:
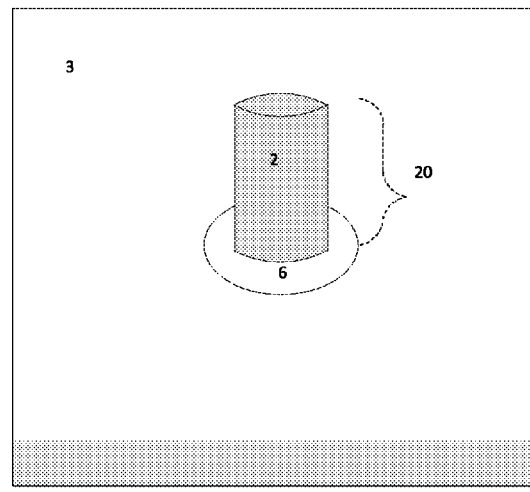
FIG. 1C shows the view from the 3D sensor in FIG. 1A when a pipe is present in the mouse hole, rat hole or the rotary table.

In a first embodiment mounted according to alternative one, as shown in FIG. 1, a 3D sensor 1 is capturing the scene/image in real-time and generating a data set, defined by a multiple of sample points, comprising a 3D data model of the captured image. Mounted according to alternative one the 3D sensor is provided in such a position and orientation that the following requirements are fulfilled:

- A sufficient large part of the sensors field 4 of view is covering the drill floor 3 around the mouse hole 6. For example 10% of the data or minimum 100 sample points.
- A sufficient large part of the sensors field 4 of view is covering the pipe 2 when present. For example 5% of the data or minimum 50 sample points.
- If a pipe 2 is placed in the mouse hole 6, the part of the pipe sticking up 20 above the drill floor is completely covered in the field of view.

In one embodiment a sufficient large region around the mouse hole, 6 on the drilling floor has a known geometrical shape that can be used as a reference to define a virtual plane, and that the pipe 2 can be approximated with a cylinder.

The drill floor can in some cases be assumed to be flat. In this case the stickup-height is calculated from the plane approximated to the flat drill floor and up to the top of the approximated cylinder.

In another case the term "drill floor" might actually be a virtual plane defined at a specific position and rotation relative to some object with geometrical shape different from a plane. This object might be described by a 3D model and used to detect and is define the virtual plane. Another option is to let the present invention measure and store information about the object based on the sensor data. This stored information about another object rather than a flat area can then be used for detection and definition of the virtual plane during operation.

Based on the assumption on the position and orientation of the 3D sensor 1 and on the scene, the plane 3 close to the mouse hole 6 can be extracted from the data set representing the captured image. Data points on the plane can then be removed and data points representing the pipe will remain in the data set. A pipe 2 can be extracted using only the remaining data points in the data set. If the pipe extraction fails, no pipe is present in the mouse hole 6. If the pipe extraction succeeded, the mouse hole 6 contains a pipe 2 and the stick up height 20 can be computed.

In one use of the first embodiment the following assumptions may be made:

- A sufficient large region around the mouse hole 6 may be planar, for example a circle 22 with radius 30 cm larger that the radius of the mouse hole 6, or the area surrounding the hole might have another recognizable geometrical shape.
- The orientation and position of the 3D sensor is such that the sufficient number of sampling points are located on the region surrounding the mouse hole 6. For example 100 samplings points.
- Approximate distance 23 to the mouse hole 6 is known. For example the distance to the center of the mouse hole 6 is known, e.g. at an accuracy of +/−100 cm, more preferably +/−50 cm, most preferably +/−30 cm.

Figure 2:
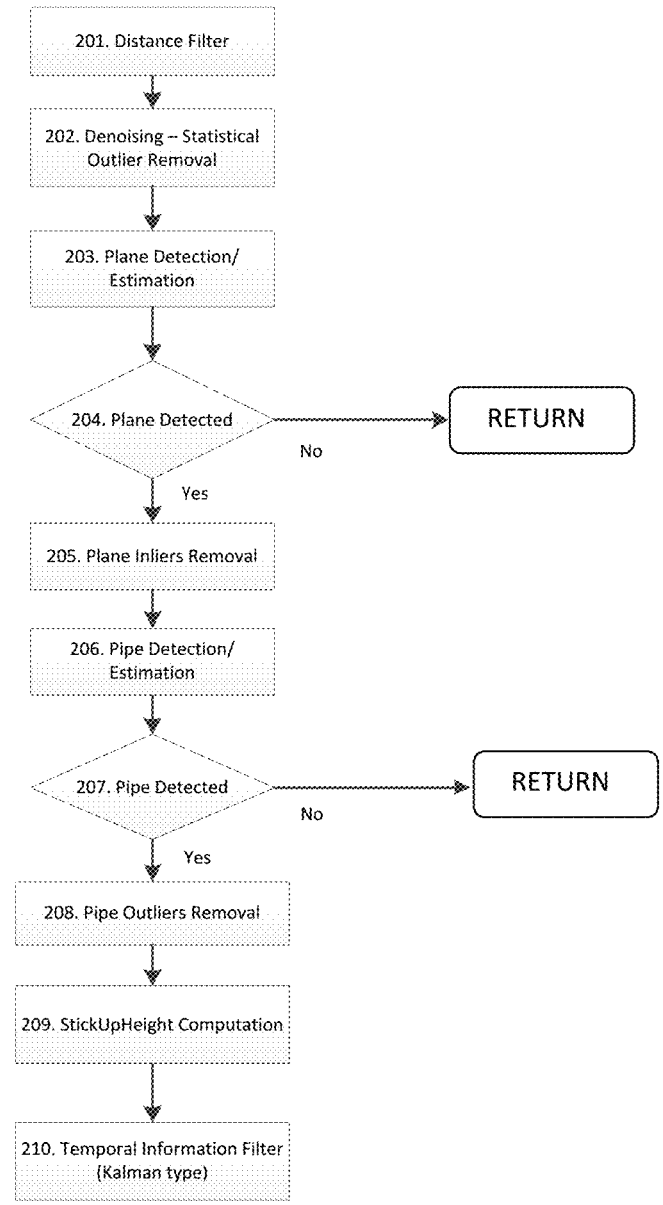
FIG. 2 is a flow chart of the Main Algorithm for Stick Up Height computation.

When a point cloud comprising and representing the 3D image is used as input to a connected computing means the method described in FIG. 2 may reveal whether a pipe is present in the mouse hole 6, and if a pipe 2 is present, the stick up height 20 of the portion of the pipe above the mouse hole 6 may be computed.

Figure 7:
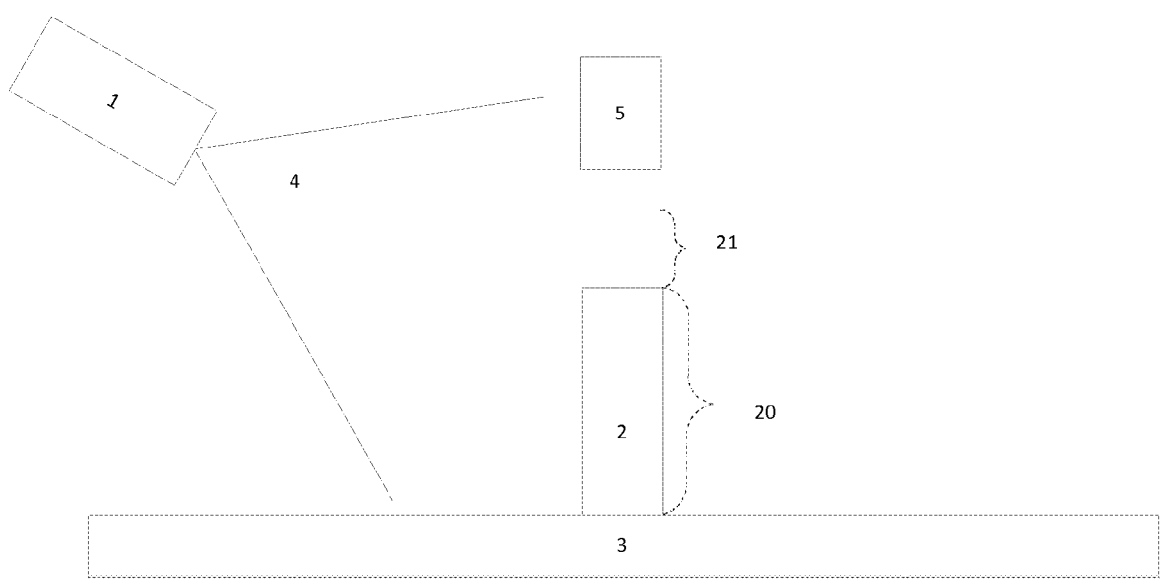
FIG. 7 is a side view system overview of a Tool Joint Finder System with the sensor in a first position.
Figure 15:
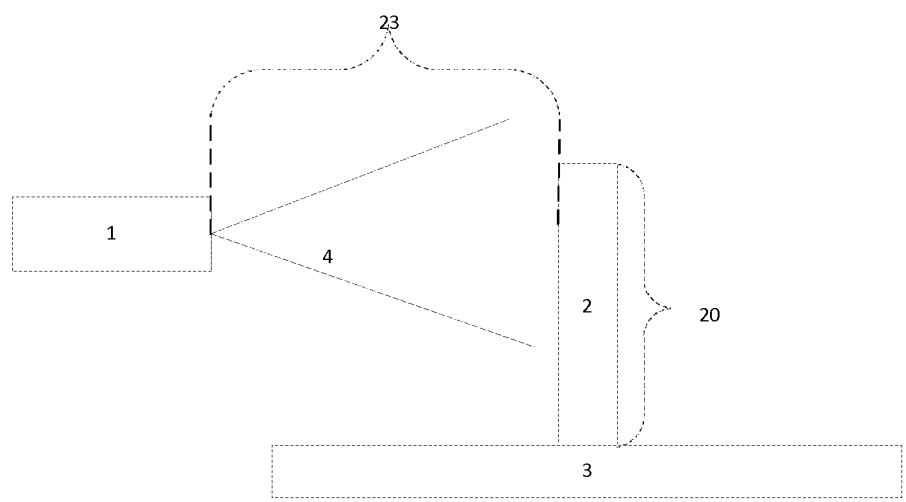
FIG. 15 is a side view system overview of a typical setup for determination of Stick Up Height when the 3D sensor is mounted in the second position.
Figure 16A:
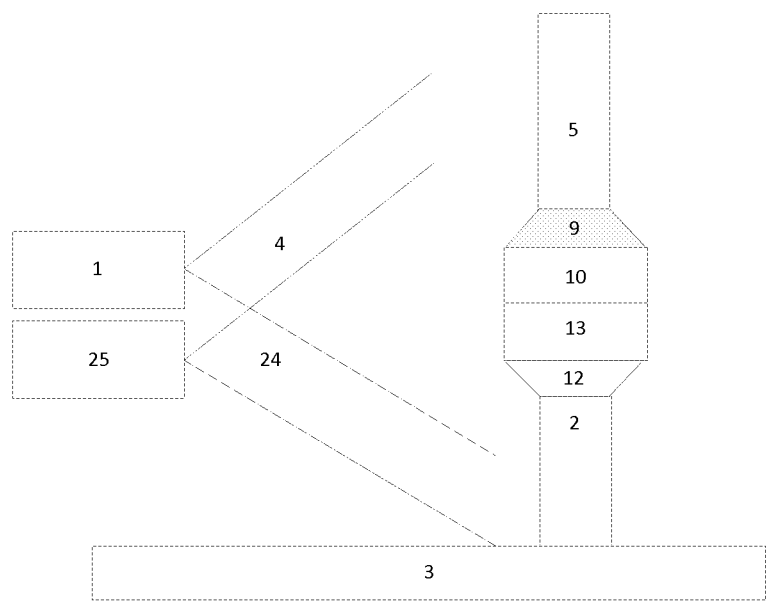
FIG. 16 A is a side view system overview of a typical setup for determination of the tool joint region where a 3D sensor and an ordinary camera are used.
Figure 16:
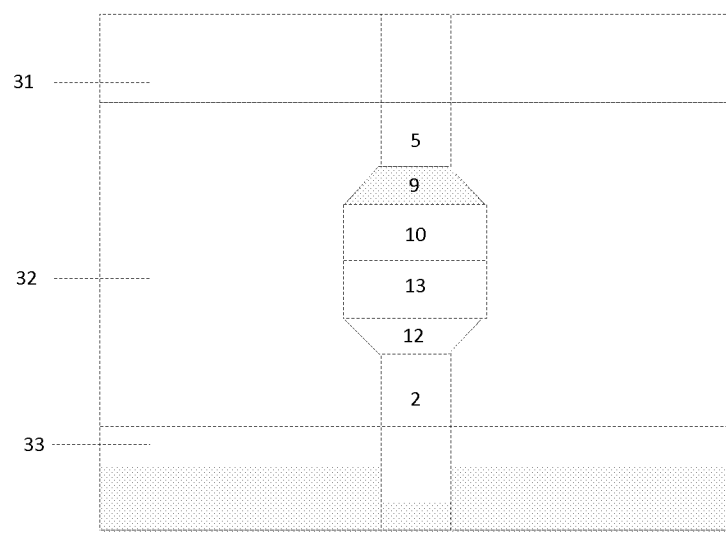

In a second embodiment the present invention is mounted according to alternative two, as shown in FIG. 15, where a 3D sensor 1 is capturing the scene/image in real-time and generating a data set, defined by a multiple of sample points, comprising a 3D data model of the captured image. Mounted according to the first position (ref. FIG. 1 and FIG. 7) the 3D sensor is provided in such a position and orientation that the following requirements are fulfilled:

- A sufficient large part of the sensors field 4 of view is covering the pipe 2 when present. For example 5% of the data or minimum 50 sample points.
- If a pipe 2 is placed in the mouse hole 6, the part of the pipe sticking up 20 above the drill floor is completely covered in the field of view.

It is further assumed that the pipe 2 can be approximated with a cylinder.

It is further assumed that the user manually supply information about the orientation and position of the plane representing the drilling floor. The manually supplied plane is replacing the previous automatically computed plane. Data points on the plane can then be removed and data points representing the pipe will remain in the data set. A pipe 2 can be extracted using only the remaining data points in the data set. If the pipe extraction fails, no pipe is present in the mouse hole 6. If the pipe extraction succeeded, the mouse hole 6 contains a pipe 2 and the stick up height 20 can be computed.

In one use of the first embodiment the following assumptions may be made:

- Approximate distance 23 to the mouse hole 6 is known, e.g. at an accuracy of +/−100 cm, more preferably +/−50 cm, most preferably +/−30 cm.

When a point cloud comprising and representing the 3D image is used as input to a connected computing means the method described in FIG. 2 may reveal whether a pipe is present in the mouse hole 6, and if a pipe 2 is present, the stick up height 20 of the portion of the pipe above the mouse hole 6 may be computed.

Optionally the orientation of the pipe, if present and the position/orientation of the detected plane may be identified.

Figures 8A, 8B:
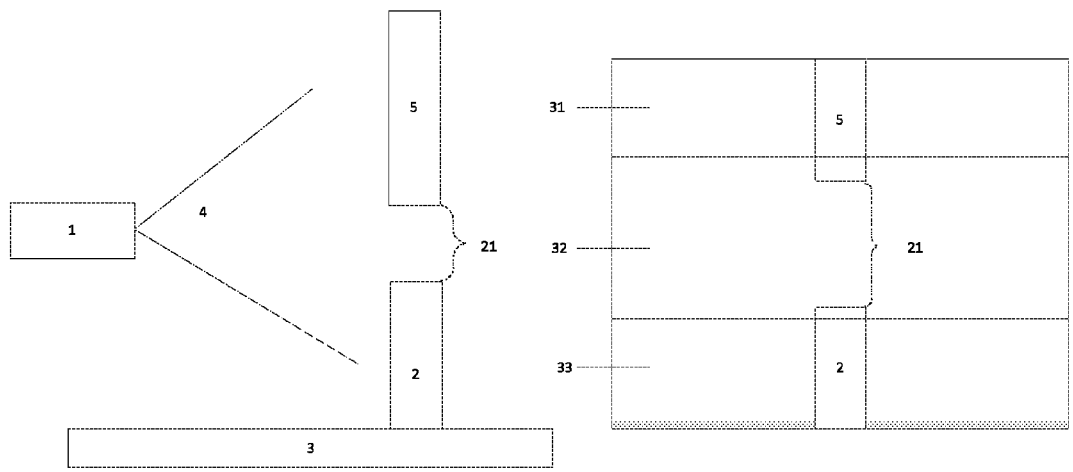
FIG. 8A is a side view system overview of a Tool Joint Finder System with the sensor in a second position.
FIG. 8B is a view captured by the sensor in the second position.

In FIG. 2 the following steps may be defined in more detail:

201. Distance filtering: Remove data points that are too close to the sensor or too far away from the sensor. For example +/−30 cm of the estimated distance to the mouse hole.
202. Denoising—Statistical Outlier Removal: Denoising using the statistical outlier removal algorithm in which all outliers are removed from the data set as described in FIG. 5).
203. Plane Detection/Estimation: A plane is detected and, if detected, estimated using robust estimation methods (RANSAC based) (see FIG. 3). If sensor is mounted according to the second position as described in FIG. 8 and FIG. 15, a virtual plane may be returned in this step.
204. [Decision] Was a plane Detected?
205. Plane inliers Removal—inliers (i.e. points that lie in the plane) to the current plane model is removed and only the outliers are used in the further processing 206. Pipe Detection/Estimation—If a pipe is detected in the dataset then the orientation, the position and the radius is estimated as described in flowchart FIG. 4.
207. [Decision] was a Pipe Detected?
208. Pipe Outliers Removal—remove the outliers to the current pipe estimation (i.e. only keeping the points that lie on the detected pipe).
209. StickUpHeight Computations—calculate the longest distance between the pipe inliers data and the detected plane. This is the orthogonal distance between the pipe and the plane (i.e. the stickup height).
210. Temporal Information Filter (Kalman type): By blending the stick-up height estimation with previous stick-up height estimations, the estimation will be more robust and stable. It is also possible to use other filtering techniques.

Figure 3:
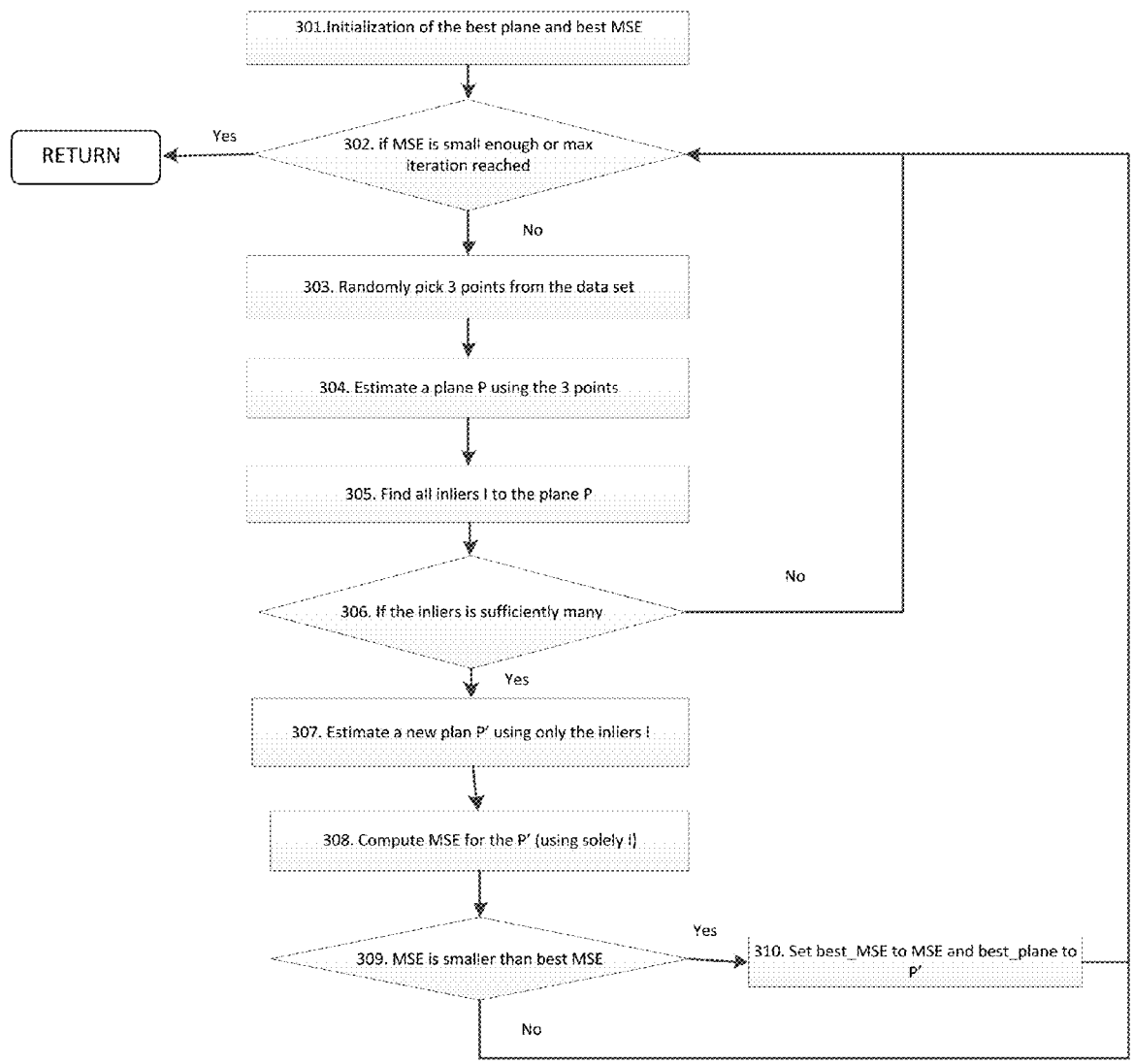
FIG. 3 is a flow chart of the Plane extraction and estimation (RANSAC based).

A RANSAC based estimation algorithm method for determining the Plane is defined in FIG. 3. In the method the data set is used as input and computing means may determine whether a plane was found or not, a model of the plane defined as Ax+By+Cz+D=0, and the outliers and inliers found in the data set. A set of governing parameters for the computations may comprise the plane tolerance defined as the maximum distance to the plane to be considered as an inlier, the minimum number of relative and/or absolute inliers, and the maximum MSE tolerance.

FIG. 3 defines in more detail the method used to compute the above mentioned results and comprise the steps:
  301. Initialize variables: best_plane=0 and best_MSE=max value
  302. Continue to improve values as long as best_MSE>Maximum MSE tolerance and number of iteration is <=max number of iteration
  303. Randomly pick 3 points in the data set.
  304. Find the plane—P—defined by the 3 points.
  305. Find all inliers—I—to the plane P using the plane tolerance.
  306. If (#1>Minimum number of inliers)
  307. Estimate a new plan P' using solely the inliers I.
  308. Compute the MSE for the new P'.
  309. If (MSE<best_MSE)
  310. best_MSE=MSE and best_plane=P'

Figure 4:
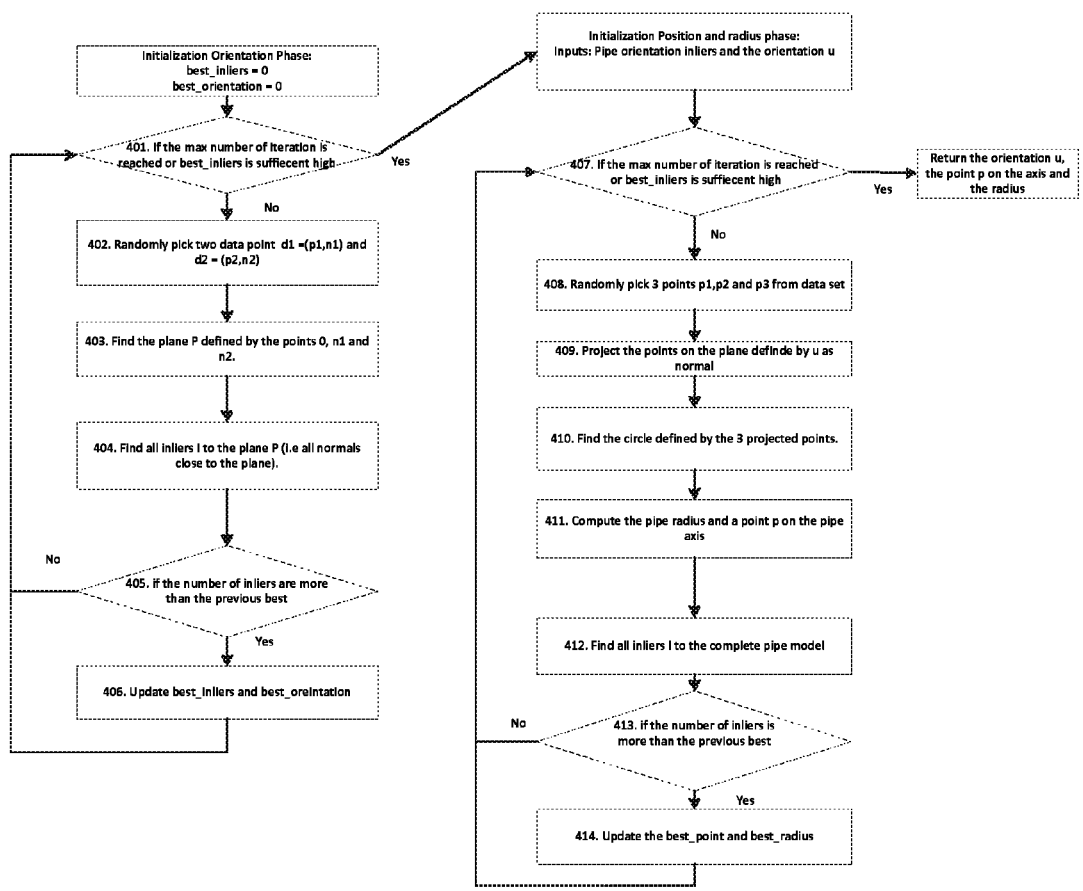
FIG. 4 is a flow chart of the Pipe Estimation Algorithm.

A RANSAC based estimation algorithm method for determining the Pipe is defined in FIG. 4. The pipe detection is done in two steps: first the orientation of the pipe is estimated and secondly the position and radius are estimated. Both steps use the is RANSAC/SAC based methods. It is assumed that a normal has been estimated in each point and that the normals are normalized (i.e. have length 1). In the method the data set containing point (location) and normal (orientation) of each data—d=(p,n), p=(x,y,z) and n=(nx,ny,nz) is used as input, and computing means may determine whether a pipe was detected, and if a pipe was detected, a model containing the orientation, location and radius of the pipe. A set of governing parameters for the computations may comprise the maximum numbers of iterations and the inliers acceptance level.

FIG. 4 defines in more detail the method used to compute the above mentioned results and comprise 2 phases comprising the steps:
  Phase 1—determine the pipe orientation axis:
  401. [Decision Loop] While not reached the maximum number of iteration and the number of inliers is not sufficient high.
  402. Randomly pick 2 data points d1=(p1,n1) and d2=(p2, n2).
  403. Find the plane P defined by points 0,n1 and n2. (n1 and n2 are viewed as points on the unit sphere and a plane intersecting through the unit sphere passing through origo (0).)
  404. Find all inliers I to the plane P among the normal vectors n (considered as points).
  405. [Decision] if the number of inliers are more than the previous best
  406. Update the best number of inliers and the best orientation to the normal of P.
  Phase 2—determine radius and point on axis (location), where input to the next process steps is the orientation u and the inliers of the computed orientation:
  407. [Decision loop] While not reached the maximum number of iteration and the number of inliers is not sufficient high.
  408. Randomly pick 3 points p1, p2 and p3.
  409. Project the points on to the plane defined by u (passing through origo).
  410. Find the circle C defined by the 3 projected points.
  411. Compute the pipe radius and point on pipe p using C.
  412. Find all inliers I to the complete pipe model.
  413. [Decision] If the number of inliers is larger than the previous best
  414. Update the current best number of inliers, radius and point on axis p.

Figure 6:
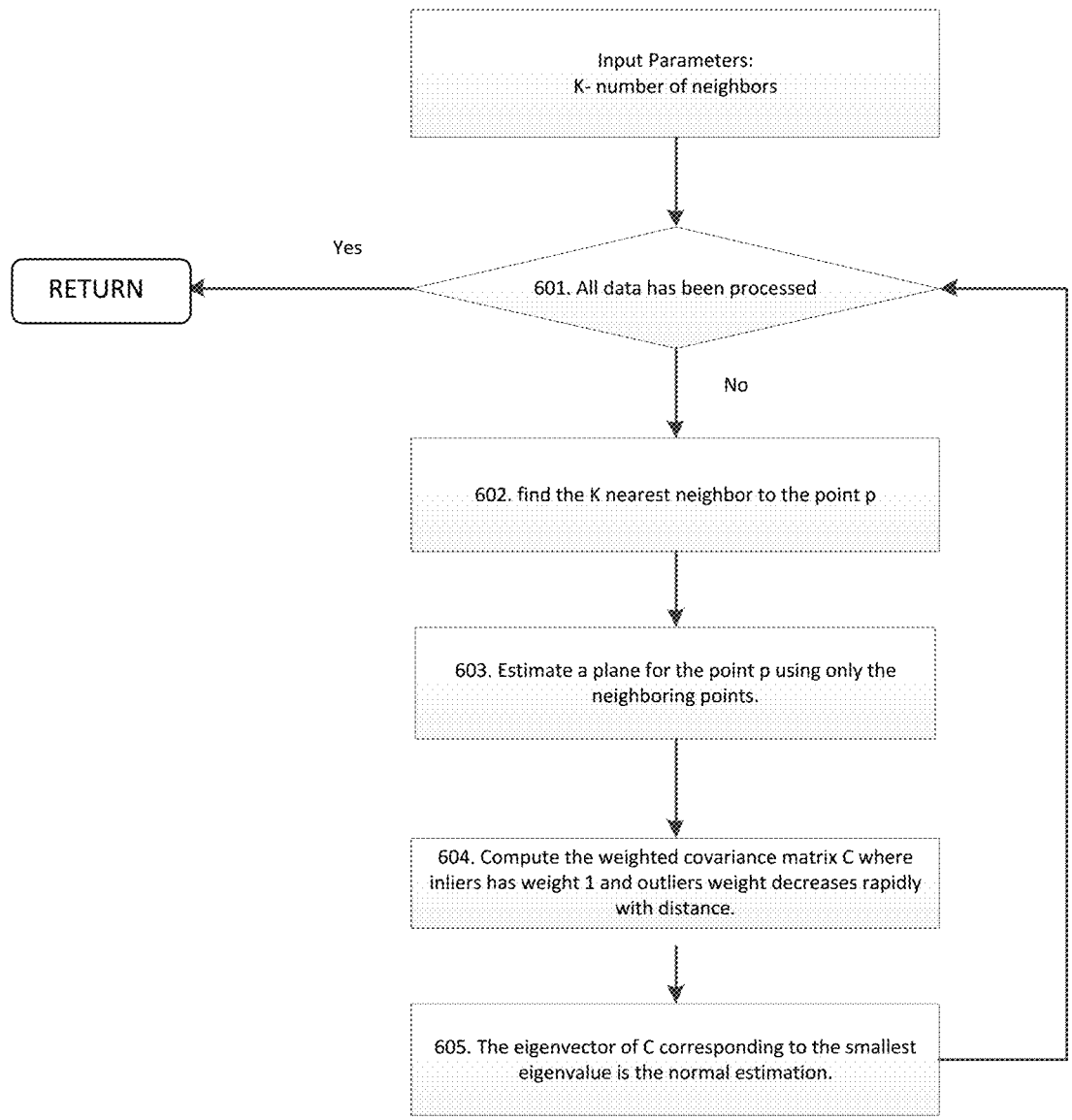
FIG. 6 is a flow chart of the Normal Estimation Algorithm.

An estimation algorithm method for estimating the Normal is defined in FIG. 6. A plane is estimated locally around each point using a robust estimator. A local weighted covariance matrix is computed, where inliers have weight 1 and the outliers' weights decreases rapidly with increasing distance to the point. The eigenvector corresponding to the smallest eigenvalue is the normal estimation.

In the method the data set is used as input, and computing means may estimate the data set containing the point cloud and a normal (orientation) for each point in the cloud. A set of governing parameters for the estimation may comprise the variable K which is the number of neighbors.

FIG. 6 defines in more detail the method used to compute the above mentioned results and comprise the steps:
  601. For each point p in the data set D
  602. Find the k nearest neighbor top (using the Euclidean distance).
  603. Estimate a plane for the point p using solely the neighboring points.
  604. Compute the weighted covariance matrix C where inliers have weight 1 and outliers have weight which decreases rapidly with increasing distance to the point p.
  605. The eigenvector of C corresponding to the smallest eigenvalue is the normal estimation for the point p (i.e. PCA decomposition).

Figure 5:
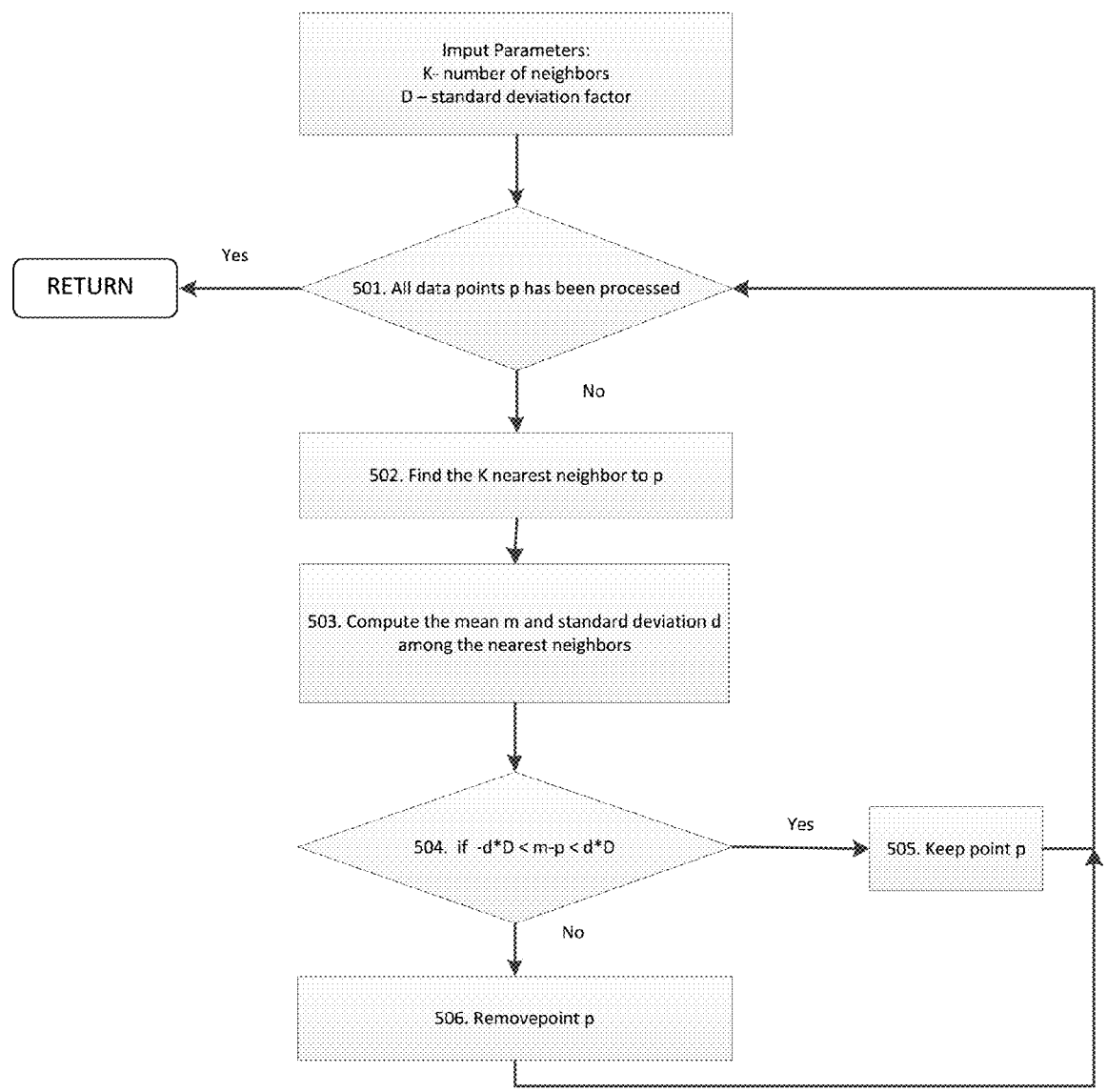
FIG. 5 is a flow chart of the Statistical Outliers Removal Algorithm.

A computation algorithm method for determine the Stick up height is defined in FIG. 5. The largest distance between the inlier data and plane is computed, In the method the data set containing inliers for the detected pipe is used as input together with a plane normal (A,B,C) and the off-set D, a set of governing parameters for the computation may comprise the variable K which is the number of neighbors to be used and D-standard deviation parameter.

FIG. 5 defines in more detail the method used to compute the above mentioned results and comprise the steps:
  501. for each data point p in the data set
  502. Find the k nearest neighbor of the point p (using the Euclidean distance).
  503. Compute the mean -m- and the standard deviation -d-.
  504. [Decision] If $-d*D<p-m<d*D$ 505. the point p is kept 506. [else] the point will be removed from the data set (i.e. is considered to be an is outlier).

In another embodiment of the invention, the problem to be solved is to determine if a lower pipe 2 is present in the mouse hole 6, and, if present, determine the position and orientation of the lower pipe; and determine if an upper pipe 5 is present, and, if present, determine the position and orientation of the upper pipe. Furthermore, if an upper 5 and a lower pipe 2 are present determine the vertical distance 21 between the two pipes.

The 3D sensor 1 is mounted in one of two alternative position and orientation. In a first alternative as shown in FIG. 7, the sensor 1 may be mounted such that part of the drill floor 3 is comprised by the sensor field of view 4. In a second alternative as shown in Error! Reference source not found. 8, the sensor 1 is mounted such that only the pipes 2, 5 are comprised by the sensor field of view 4.

In the first alternative when the drill floor is present in the field of view 4, the pipe extraction method discussed above used in the stick-up height computation can be used directly to extract the pipes 2, 5 based on data from the lower part of the field of view 4 only. In the second alternative the pipes 2, 5 can be extracted directly without first extracting a plane.

In this embodiment the 3D sensor must be provided in a position and orientation such that the following requirements are fulfilled:

The assumed position of the pipe connection is approximately in the vertical center of the field of view 4. For example the vertical center 32 of the field of view 4 +/−20% of the vertical height of the field of view 4.

The lower pipe 2 is present in the lower vertical part 33 of the field of view 4. (In alternative 2 the drill floor 3 will also be present.) For example in the vertical lower 25% of the sensor data.

The upper pipe 5 is present in the upper vertical part 31 of the field of view. For example in the vertical upper 25% of the sensor data.

In these embodiments it is assumed that the distance 21 between the pipes 2, 5 that should be connected and any other object found in the scene is sufficiently large, and/or the shape of the objects are sufficiently distinguishable and recognizable. For example the distance between the sensor 1 and the mouse hole 6 is known, and the distance to any objects not relevant to the process, such as rough neck e.g. 100 cm (not excluding other distances), and that the pipes 2, 5 can be approximated with a cylinder (i.e. a pipe is can be parameterized with a radius, 3D orientation vector, starting position and length).

The following model parameters are approximately known:

The distance 23 between the 3D sensor 1 and the mouse hole 6.

Optionally, to reduce false pipe detection, the radius of the pipe 2, 5. In one embodiment can the radius of the pipe 2, 5 is e.g. 15 cm+/−10 cm (not excluding other radiuses).

Figure 9:
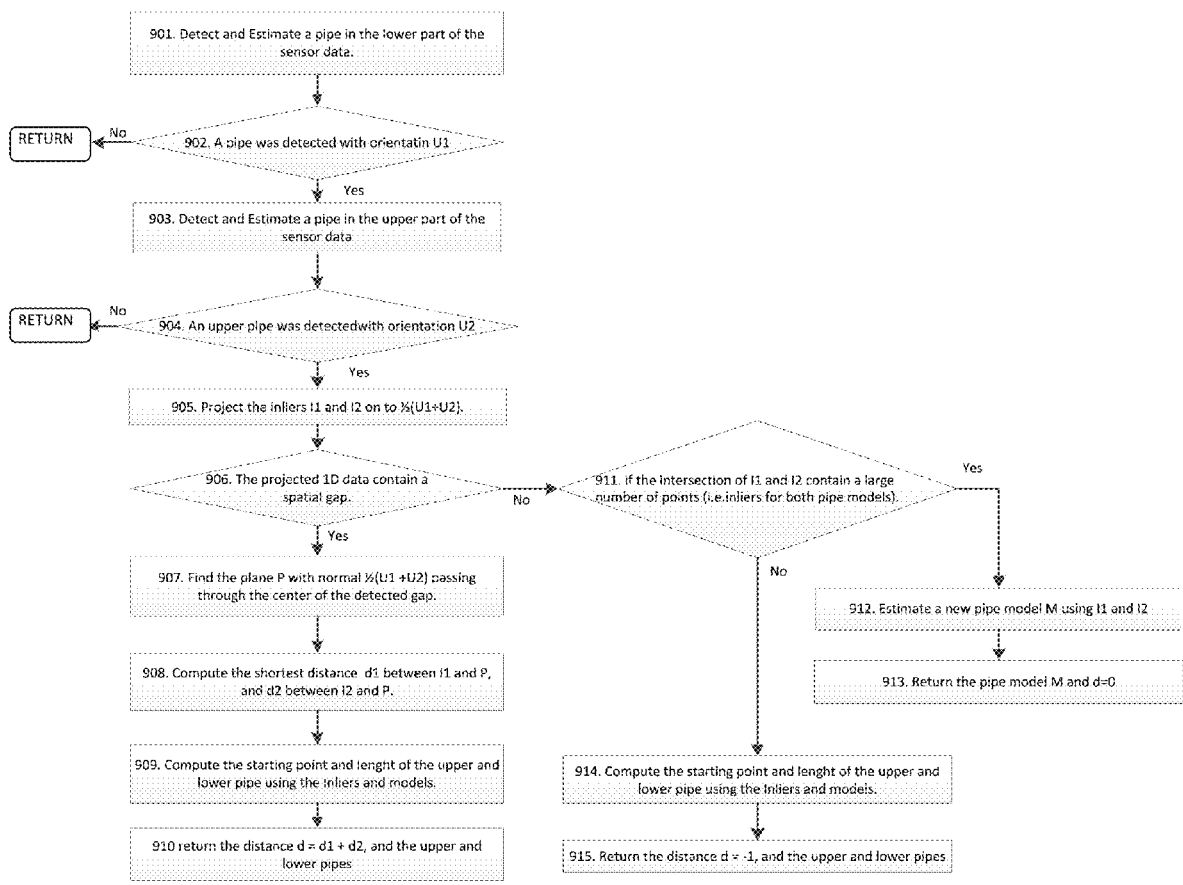
FIG. 9 is a flow chart of the Main Tool Joint Finder (TJF) algorithm.

One aspect of the invention is to find the Tool Joint as shown in flowchart FIG. 9. It is assumed that the lower pipe 2, if present, is contained in the sensor data representing the lower part 33 of sensor view 4, for example in the lowest 25% of the sensors field of view 4. If an upper pipe 5 is present, it is contained in the sensor data representing the upper part 31 of the sensor view 4, for example in the upper 25% of the sensor field of view. The sensor 1 is mounted such that the pipe connection is comprised roughly in the vertical center 32 of the sensor field of view 4.

When a point cloud comprising and representing the 3D image is used as input to a connected computing means, the method described in FIG. 9 may reveal if 0, 1 or 2 pipes are present in the field of view 4 and if 0, 1 or 2 pipes are present, the orientation and the position of the pipes, and if 2 pipes 2, 5 are detected the distance 21 between the pipes 2, 5.

The stick up height 20 of the portion of the pipe above the mouse hole 6 may be computed.

The input data comprises the Data set (Point cloud), and the following output is expected:

Pipe detection information—0, 1 or 2 pipes was detected in the field of view.

If detected—0, 1 or 2 pipes—the orientation and position of the pipe.

If 2 pipes was detected the distance between the pipes.

FIG. 9 defines in more detail the method used to find the Tool Joint, and comprise the steps:

901. Detect and Estimate a pipe in the lower part of the sensor data: solely the vertical lower part of the sensor data is used for detecting and estimating a lower pipe.

902. [Decision] A lower pipe was detected with orientation U1. If no lower pipe was detected the algorithm stops and return 0. If no lower pipe is present no pipe connection can be performed. (See FIG. 10).

903. Detect and Estimate a pipe in the upper part of the sensor data. Solely the vertical upper part of the sensor data is used for detecting and estimating an upper pipe.

904. [Decision] An upper pipe was detected with orientation U2. If no pipe was detected the algorithms stops and return 1 together with the position and orientation of the lower pipe. (See FIG. 10).

905. Project the inliers I1 and I2 on to U=½(U1+U2). U is the "average" orientation of the upper and lower pipe. If the lower and upper pipes are connected then the projected data will continuous contain data along U. if the pipes are connected the minimum distance between the projected points on U in both positive and negative direction will be small. On the other hand, if the pipes are not connected then the projected data will contain a gap, i.e. a larger interval which does not contain any projected point. The end points of the pipes projected on U are characterized by the property that they have only close neighbors on one side.

906. [Decision] The projected 1D data contain a spatial gap. If the projected data contains a gap then the two pipes are separated (i.e. not connected) and the position and orientation for the two pipes must be determined.

907. Find the Plane P with normal ½(U1+U2) passing through the center of the detected gap.

908. Compute the shortest distance d1 between I1 and P, and d2 between I2 and P.

909. Compute the starting point and length of the upper and lower pipe using the inliers and models.

910. Return the distance d=d1+d2, and the upper and lower pipes. d1 is the distance between the lower pipe and the plane separating the lower and upper pipe, and d2 is the distance between the upper pipe and the same plane. The distance between the vertical distance between the two pipes is the sum of the two distances (d=d1+d2).

911. [Decision] If the intersection of I1 and I2 contain a large number of points (i.e. inliers for both pipe models), this indicates that the two pipes are connected and should be modeled as one pipe (instead of an upper and lower pipe estimation).

912. Estimate a new pipe model M using I1 and I2. This is the estimation of the connected pipe using both inliers set. (See FIG. 10)

913. Return the pipe model M and d=0.

914. Compute the starting point and length of the upper and lower pipe using the Inliers and models. This is the case then the upper pipe is below the highest is point of the lower pipe (i.e. the upper pipe is under the connection point). This indicates that upper pipe is in front or behind the lower pipe.

915. Return the distance d=−1, and the upper and lower pipes.

Figure 10:
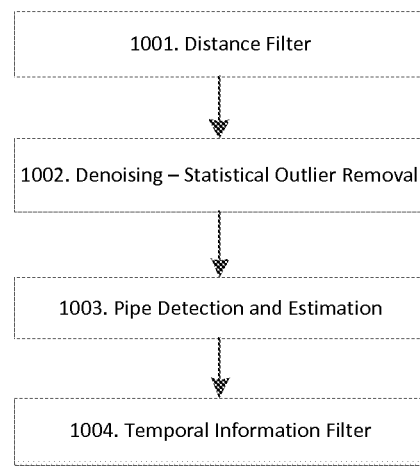
FIG. 10 is a flow chart of the Main pipe extraction algorithm.

The extraction algorithm for the Main Pipe is defined in FIG. 10 and uses the data set containing the point cloud as input, whereas the output comprise a detection result (true or false) indicating whether a pipe was detected, and a pipe model.

FIG. 10 defines in more detail the method used to extract the main pipe, and comprise the steps:

1001. Distance Filter—remove data points that too close or too far away.

1002. Denoising—Statistical Outlier Removal—remove data points that are considered to be outliers. (See FIG. 5).

1003. Pipe Detection and Estimation—(See FIG. 5)

1004. Temporal Information Filter (Kalman type): By blending the current pipe estimation with previous pipe estimations, the estimation will be more robust and stable. The temporal blending (i.e. recursive estimation) is done by Kalman filtering, but other filtering techniques may optionally be applied. filtering.

FIG. 11A-C shows the tool joints during pipe connections. The components are Upper pipe 5, "cone" shaped part 9 of upper joint, "flat" shaped part 10 of the upper joint, upper connection "screw" 11, "flat" shaped part 13 of the lower pipe, "cone" shaped part 12 of the lower pipe and lower pipe 2. 11A) show the pipes before the pipes are connected 11B) show the pipes after they have been connected ("stabbed") but not tighten and 11C) show the pipes after they have been connected and tighten. 11B) is the input for Joint finding algorithm during pipe mounting and 11C) is the input for the joint finding algorithm during pipe dismounting.

A separate algorithm for estimating the tool joint position is offered in this embodiment. To ensure an efficient estimation a sufficient large part of the upper pipe 5 (without casing, or box) should be present in the vertical upper part 31 of the field of view 4, e.g. 10% of the most upper part of the field of view. A sufficient large part of the lower pipe 2 (without casing) should be present in the vertical lower part 33 of the field of view, e.g. 10% of the most lower part of the field of view 4, and the connection is done roughly in the center 32 of the vertical field of view 4, e.g. the pipe with casing is present in the most central 10% of the field of view 4, and the pipes are connected (i.e. case in FIG. 11B and FIG. 11C), the radius difference between the cased region and none cased region is sufficient large, e.g. 3 cm, and the connection point is assumed to be roughly in the middle of the total length of the casing section of the two connected pipes is (i.e. the tool joint region after tighten the pipes is symmetric). In cases where size of the shoulder/box/casing regions differ from standard sizes, an alarm may be triggered to use alternative identifications methods to find the exact location of the connection. This may be implemented to prevent providing false joint position in cases where the shoulder regions of the pipes have been altered, e.g. when creating new threads.

Other mechanisms will also be adapted when tool joint is not displaying any gap or shoulder shapes, i.e. in the case of 11F. This mechanism may include identification by computer means and display function where operator use a marker on the computer display to identify the tool joint, or a marker by color, magnetism, graphical print, or other may identify region of tool joint.

The input to the algorithm comprises the data set, and the output comprises the position, orientation, length and diameter of the tool joint region. Predefined parameters are approximation of the non-cased pipe radius, for example 10 cm+−/7 cm, and approximation of the cased pipe radius, for example 17 cm+/−7 cm.

Figure 12:
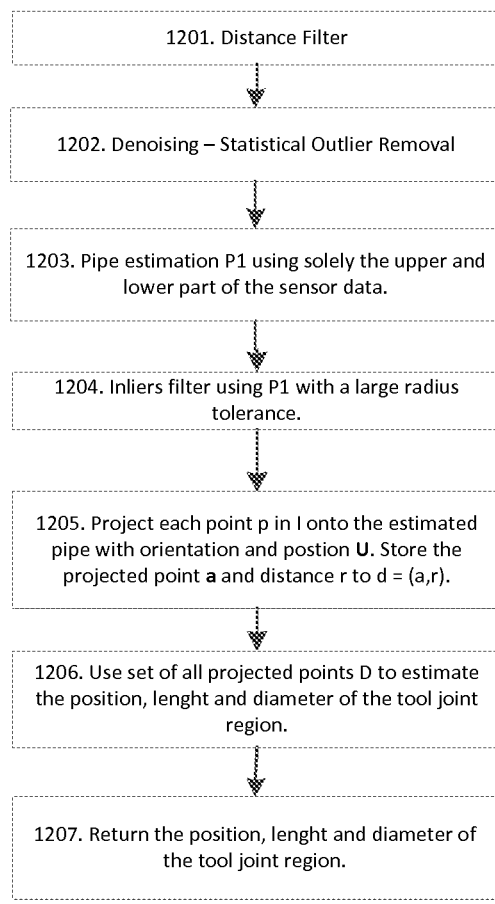
FIG. 12 is a flow chart of the Main Tool Joint location estimation algorithm.

FIG. 12 defines in more detail the method used for estimating the tool joint position, and comprises the steps:

1201. Distance Filter—remove data points that are too close or too far away from the sensor.

1202. Denoising—Statistical Outlier Removal. (See FIG. 5).

1203. Pipe Estimation P1 using solely the upper and lower part of the sensor data. It is assumed that upper and lower part of the field of view solely contains non-cased pipes. This data is used to estimate one connected pipe P1.

1204. Inliers filtering using P1 with a larger radius tolerance. Remove points that are outliers to the pipe model P1 but use a larger radius tolerance such that the both the cased and non-cased data will be kept. (The cased and non-cased data will have the same axis but different radius).

1205. Project each point p in I onto the pipe axis U. Store the projected point a and the distance r−d=(a, r). The set of all projected points is denoted D.

Figure 13:
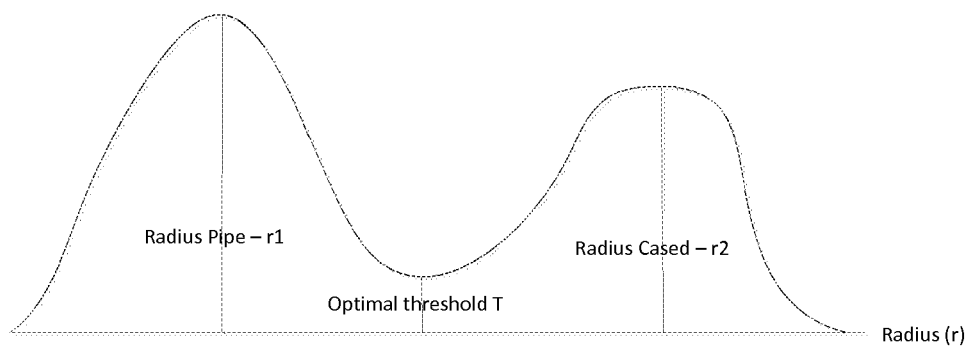
FIG. 13 is a diagram showing the Empirical distribution of the projected pipe radius data.

1206. Use the set of all projected points D to estimate the position, length and diameter of the tool joint region. (See FIG. 13 and FIG. 14).

1207. Return the position, orientation, length and diameter of the tool joint region.

An estimation algorithm is used for estimation of a 1D tool joint and is defined in FIG. 12, and assumes that the radius difference between the cased and non-cased part of the pipe is sufficient large, e.g. 2 cm, the data set is sufficiently large e.g. more than 100 data points on the pipes, the indata—radius r—can be modeled with two Gaussian distributions with mean r1 and r2, and variances s1 and s2 for the non-cased respective cased pipe data, and the vertical center of the pipe (given the field of view) contains the cased pipe.

Input data comprises the data set D containing projected data (projected position) and distances to the pipe axis i.e. set of d=(a,r) where a is the position on the pipe axis (i.e. coordinate on the axis) and r is the estimated radius for that point (i.e. the distance to the pipe axis).

Figure 14:
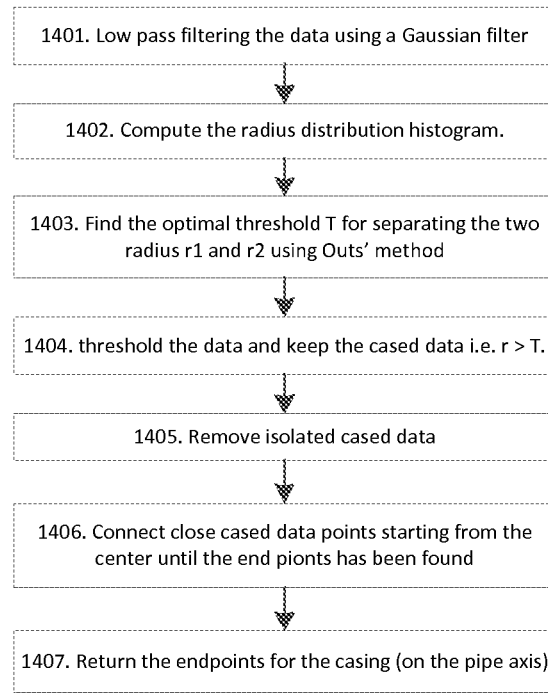
FIG. 14 is a flow chart of the Algorithm for case estimation using 1D projected data.

FIG. 14 defines in more detail the method used for estimating the 1D tool joint position, and comprises the steps:

1401. Low Pass Filtering—smoothing/denoising the radius data.

1402. Compute the radius distribution histogram—using 100 bins equally distributed over [r_min,r_max]. The histogram will contain the number of points with in the given radius determine by the bins. The histogram will contain two peaks (modes) one peak for the non-cased pipe part—with radius r1—and one peak for the cased pipe part—with radius r2.

1403. Find the optimal threshold T for separating the two radius r1 and r2 using Outs' method. Outs' method is an efficient method for finding the optimal separation value in a two mode distribution. Outs' method uses the intra class variance is minimized. (See FIG. 13).

1404. Threshold the data and keep only the cased data i.e. >T. The threshold value T is used for filtering the data so that only cased data points are kept.

1405. Remove isolated cased data. Cased data points with no close by neighbors are removed (considered to be "noise").

1406. Connect close cased data points starting from the center until the endpoints has been found. It is assumed that the central point will contain cased data and is there for used as the starting seed for the "flooding" based aggregation. The cased region is growing by adding 1D neighbors that are within a given distance to the current cased region. The "flooding" process continues until no more points can be added.

1407. Return the endpoints for the casing.

In another embodiment the stick-up height of the pipe may be the pinpointing of the uppermost point of a stand or pipe when building the stand for placing in a set-back construction. This building phase might be done in several levels above the ground, and may comprise dedicated embodiments of the invention at intervals defined by the lengths of pipes used. Typical is three pipes used to make a stand, and in such an embodiment more than one unit of the invention may be used.

In another embodiment of the invention, a 3D sensor 1 and a camera 25 is comprised in the system. An alternative algorithm for estimating the tool joint position is presented in FIG. 17. Fusing sensor information from the camera 25 and the 3D sensor 1 will increase the accuracy and operation range of the system. The camera 25 and the 3D sensor 1 are mounted together and may be comprised in a common housing. The position and orientation (pose) of the two sensors 1, 25 are known (and calibrated). The sensors 1, 25 are fixed such that the relative position and orientation between the two does not alter. The relative fixed position and orientation between the sensor 1, 25 enables mapping of the 3D data to the 2D image data, and the 2D image data to the 3D data. In other words, if an object is detected in the 3D data, it is possible to map the contour/edges of this object from the 3D data to the 2D image data captured by the camera. This can be accomplished using regular 3D transformation mathematics by projecting the object from the 3D data onto the virtual image plane of the 2D camera. This will provide information in the 2D image data that will indicate where the object was detected/located in the 3D data. For known fixed poses the data aligning problem is considered to be solved (i.e. common robust and efficient standard methods for this type of data aligning exist).

The approach described above by fusing data from a 3D sensor and a 2D camera can also be applied to all other methods described in the present invention.

To ensure an efficient estimation a sufficient large part of the upper pipe 5 (without casing) should be present in the vertical upper part 31 of the field of view 4 and of the field of view 24, e.g. 10% of the most upper part of the field of view. A sufficient large part of the lower pipe 2 (without casing, shoulder, or box) should be present in the vertical lower part 33 of the field of view, e.g. 10% of the most lower part of the field of view 4 and of the field of view 24, and the connection is done roughly in the center 32 of the vertical field of view 4 and of the field of view 24, e.g. the pipe with casing is present in the most central 10% of the field of view 4 and of the field of view 24, and the pipes are connected (i.e. case in FIG. 11B and FIG. 11C), the radius difference between the cased region and none cased region is sufficient large, e.g. 3 cm, and the connection point is assumed to be located in the middle of the total length of the casing is section of the two connected pipes (i.e. the tool joint region after tighten the pipes is symmetric).

Figure 17:
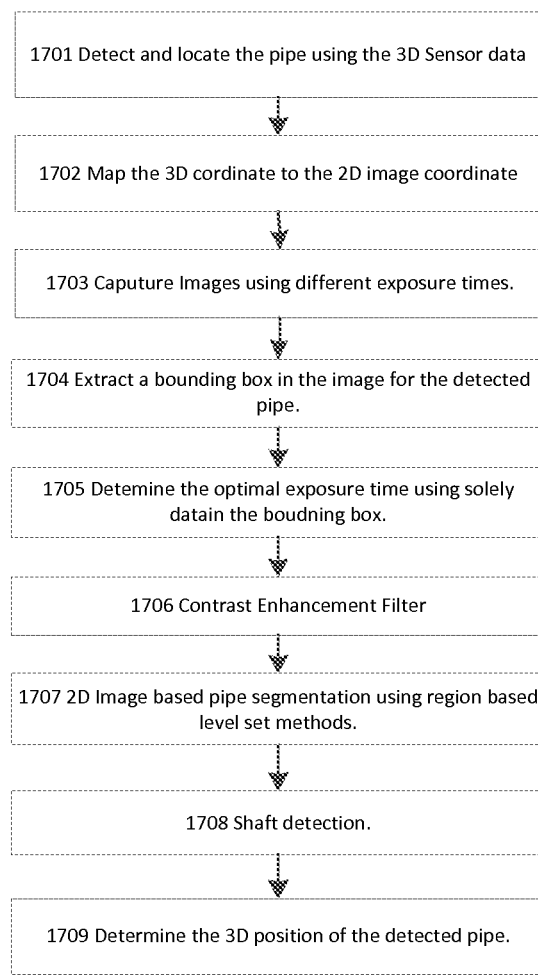
FIG. 17 is a flow chart of the Algorithm for computing the tool joint region by sensor fusion—i.e. combining data from the 3D sensor and a camera.

The input to the algorithm described in FIG. 17 comprises the data set from the 3D sensor and the 2D image from the camera 25. The output comprises the position, orientation, length and diameter of the tool joint region.

FIG. 17 defines a method were 3D sensor data and camera data are fused, for estimating the tool joint position, and comprise the steps:

1701. Detect and locate the pipe using the 3D sensor data (as described in FIG. 9).

1702. Map the 3D position of the detected pipe to the 2D images. Compute a bounding box in the 2D image coordinate that covers the whole pipe and sufficient large region around the pipe (i.e. some background data in horizontal direction).

1703. Capture images using from the camera 23 different exposure times—E1, . . . , En. This will give good 2D image data under varying illuminations.

1704. Extract the bounding box from the captured images—E1, . . . , En. The bounding box contains images of the pipe and some background data captured using different exposure times.

1705. Compute the optimal exposure time using the extracted bound boxes i.e. find the bounding box with the optimal exposure time. One possible optimal criterion could be to maximize the difference between the mean of the 10% brightest pixel and the 10% darkest pixels given that less than 1% of the pixel data are saturated or "black". Other criterion is also possible.

1706. Use contrast enhancement filter to improve the bounding box image.

1707. 2D segmentation: The 2D bounding box can be segmented into pipe and non-pipe regions very robust due to the optimal exposure capturing, contrast enhancement and rough knowledge of the position and extension of the pipe. Basic region growing level set segmentation will give a very robust segmentation. The position that was computed from the 3D sensor data is used as the staring seed for the region growing procedure. Staring using the seed the region will grow until the boundary of the pipe is detected.

1708. Shoulder/Shaft detection: Once the pipe has been accurately segmented the upper and lower shafts of the tool joint region should be detected and localized. After the segmentation the interior of the pipe has value one and the exterior (background) has value zero. The shafts can be detected by summing up the numbers of pixels belonging to the pipe in horizontal direction. This will result in a one dimensional vector containing the thickness of the pipe (in pixels). Due to the is fact that the tool joint region has a larger diameter than the pipe the one dimensional vector will have the following general structure. First it will contain the pipe diameter (in pixel) then it will slowly increase—this is the lower shaft of the pipe—until the tool joint region has been reached—which has a larger diameter than the pipe—the data will be stable until the upper shaft is reached, and finally stable once the pipe is reached. The upper and lower part of the two shafts can be detected by detecting the begging and the end of the slowly increasing/decreasing radius in the projected one dimensional data.

1709. Map the beginning and end of the upper and lower shaft back to the 3D sensor data and return the 3D position (or height over the drill floor).

As an alternative to step 1704 and 1705 it is possible to use a HDR imaging approach to merge all captured images under different exposure settings to increase the dynamic range of the captured data, and hence increase the level of quality in the image.

Figure 18:
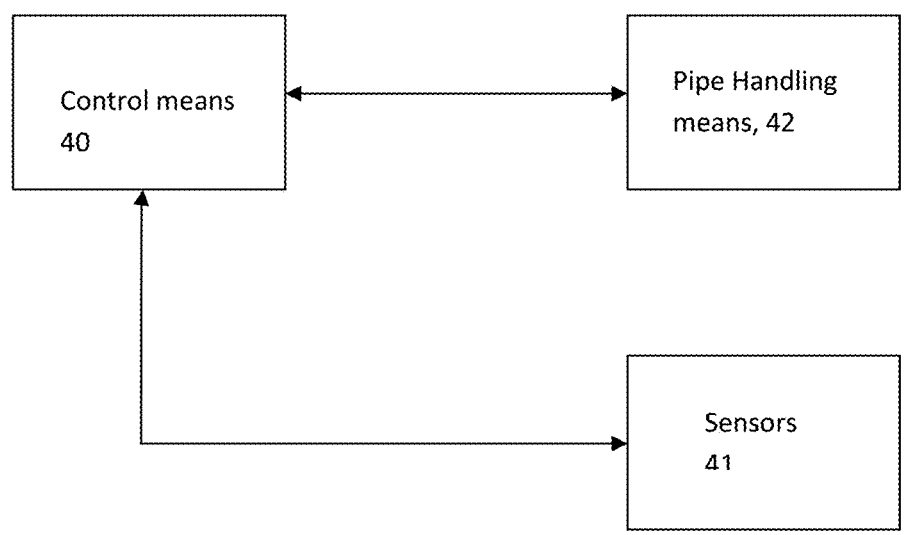
FIG. 18 is a block diagram of the control system.

A computer system or the like, comprising one or a multiple sensors 41, control means 40, pipe handling means 42, and communication lines between the blocks is shown in FIG. 18. The system may enable an operator to oversee the operation of the pipe handling. The control means 40 reads receives information from the sensor installation 41 (1, 25 and others). The control means 40 may comprise a computer and a display unit that are optionally able to interact with the operator, i.e. a touch screen showing the image of the pipe handling operation and key figures and/or offering interactive features that the operator may act upon. The control means also control the operation of the pipe handling means 42 that may comprise tools such as a rough neck, crane, or the like, in the operation process of the pipe handling. Although the control means are shown as a separate block, the control means may be partly or completely handled by the sensor installation 41 and/or the pipe handling means 42. The control means may in another implementation of the invention be a remote control facility or the like where the lines between the modules in FIG. 18 represent wireless communication paths.

The automated recognition methods may also be used in the operation of finding, fetching and moving a pipe from a storage position (typically in a pile of horizontal lying pipes) and onto the catwalk by a crane designed for this task, or vica versa to find, pick up and move a pipe from the catwalk to the storage area for pipes.

The described embodiments and the details described in each embodiment are not to be used as limitations of the invention, but merely as examples of possible embodiments. Features that are described in the embodiments are not limited to the respective embodiment description, but are to be considered as features that can be used in any of the embodiments or in any other described scenario in this invention description or in the claims or figures.

What is claimed is:

1. A method for automated detection of pipe in a drilling operation comprising:
    obtaining one or a plurality of data sets or images representing the pipe area, using one or a plurality of sensors, the data sets or images representing 3D images of the drilling operation;
    eliminating the surroundings around the pipe from the data sets or images;
    identifying the pipe in the data sets or images by processing the data sets or images; and
    guiding a pipe handling means using either a calculated stickup height of the identified pipe for engaging the pipe, or a computed distance between the sensors and a mouse hole for a moving operation of the pipe, as an input parameter.

2. The method as claimed in claim 1, further comprising calculating the stickup height from an estimated drill floor.

3. An apparatus comprising a computer and a display, wherein the apparatus arranged to perform the method as claimed in claim 1.

4. A system comprising one or a multiple sensors, control means and pipe handling means, wherein the control means comprising a computer means for controlling the pipe handling means as disclosed in method claim 1.

5. The system according to claim 4, wherein the controlling means communicate via a wireless communication line to the sensors and the pipe handling means.

6. The system according to claim 4, wherein the controlling means comprising means for communicating with an operator.

7. The system according to claim 4 comprising one or a plurality of display units for displaying images and parameters.

8. A method for automated detection of a joint between two pipes in a drilling operation comprising:
    obtaining one or a plurality of data sets or images representing the pipe joint area by using one or a plurality of sensors, the data sets or images representing 3D images of the drilling operation;
    eliminating the surroundings around the pipe from the data sets or images;
    identifying the pipe joint in the data sets or images by processing the data sets or images; and
    guiding a pipe handling sin either the distance between the pipes or distance between the sensors and pipe joint as an input parameter, as an input parameter.

9. A system comprising one or a multiple sensors, control means and pipe handling means, wherein the control means comprising a computer means for controlling the pipe handling means as disclosed in method claim 8.

10. The system according to claim 9, wherein the controlling means communicate via a wireless communication line to the sensors and the pipe handling means.

11. The system according to claim 9, wherein the controlling means comprising means for communicating with an operator.

12. The system according to claim 9 comprising one or a plurality of display units for displaying images and parameters.

* * * * *